(12) United States Patent
Tazaki

(10) Patent No.: US 7,944,825 B2
(45) Date of Patent: May 17, 2011

(54) ATM CELL/PACKET SWITCH AND COMMUNICATION CONTROL METHOD USING THE SAME

(75) Inventor: Yuichi Tazaki, Tokyo (JP)

(73) Assignee: NEC Corporation, Tokyo (JP)

(*) Notice: Subject to any disclaimer, the term of this patent is extended or adjusted under 35 U.S.C. 154(b) by 303 days.

(21) Appl. No.: 11/797,415

(22) Filed: May 3, 2007

(65) Prior Publication Data
US 2007/0206593 A1 Sep. 6, 2007

Related U.S. Application Data

(62) Division of application No. 10/165,682, filed on Jun. 7, 2002, now Pat. No. 7,304,989.

(30) Foreign Application Priority Data

Jul. 11, 2001 (JP) .................................. 2001-211063

(51) Int. Cl.
*H04L 12/26* (2006.01)
*H04L 12/28* (2006.01)
*H04L 12/56* (2006.01)

(52) U.S. Cl. ...................... 370/230; 370/395.7; 370/415

(58) Field of Classification Search .................. 370/389, 370/371, 395.7, 230, 415
See application file for complete search history.

(56) References Cited

U.S. PATENT DOCUMENTS

| | | | | |
|---|---|---|---|---|
| 4,910,733 A | * | 3/1990 | Sommani et al. | 370/218 |
| 5,243,653 A | * | 9/1993 | Malek et al. | 380/272 |
| 6,292,911 B1 | | 9/2001 | Swanson | |
| 6,487,168 B1 | | 11/2002 | Hamami | |
| 6,671,274 B1 | * | 12/2003 | Ding et al. | 370/389 |
| 6,690,241 B2 | * | 2/2004 | Ooishi et al. | 331/57 |
| 2001/0056521 A1 | * | 12/2001 | Fujiwara et al. | 711/167 |

FOREIGN PATENT DOCUMENTS

| | | |
|---|---|---|
| JP | 58-26393 | 2/1983 |
| JP | 05-298192 | 11/1993 |
| JP | 7-154391 | 6/1995 |
| JP | 11-308227 | 11/1999 |
| JP | 111-355310 | 12/1999 |

* cited by examiner

*Primary Examiner* — Alpus H Hsu
*Assistant Examiner* — Saad Hassan
(74) *Attorney, Agent, or Firm* — Young & Thompson

(57) ABSTRACT

In order to provide an ATM cell□packet switch which can easily maintain the band for the normality confirmation packet of the user data transfer path without influencing the user band at a state of in□band, and a communication control method using the switch, at least provided in the switch are: an SDRAM for storing the user data; a normality confirmation packet generator; a timing generator for generating the timing of a refresh cycle of the SDRAM; a selector for transferring the normality confirmation packet at the time of the refresh; and a packet reception unit for extracting the packet identifying information from the received packet data, and comparing the normality confirmation packet directly received from the packet generator to the normality confirmation packet received via the switch unit thereby to confirm the normality when the packet data is the normality confirmation packet.

14 Claims, 3 Drawing Sheets

ATM CELL/PACKET SWITCH AND COMMUNICATION CONTROL METHOD USING THE SAME

BACKGROUND OF THE INVENTION

1. Field of the Invention

The invention relates to an ATM (Asynchronous Transfer Mode) cell/packet switch and a communication control method using the switch and, more specifically, to an ATM cell/packet switch which enables periodical normality confirmation and communication between processors without influencing the user traffic, and a communication control method using the same.

2. Description of the Related Art

When a cell/packet for maintenance is inserted to confirm the normality of a router for an ATM cell/IP (Internet Protocol) packet, it is necessary to use the same communication path as the user band to confirm the normality. In that case, a cell/packet for health check is inserted when there is no user cell/packet, or the cell/packet for health check is periodically inserted by interrupting the user cell/packet band.

However, in the case where the cell/packet for health check is inserted when there is no user cell/packet, it requires a circuit for detecting the user traffic and sorting out the confliction with user traffic. Also, in the case where the periodical normality confirmation is performed, the user cell/packet band is interrupted. Therefore, it causes a problem that the normality confirmation of a device becomes difficult when the user traffic is heavy.

SUMMARY OF THE INVENTION

The invention has been designed to overcome the foregoing problems. An object of the invention is to provide an ATM cell/packet switch which, in an ATM switch and a packet switch which require a memory with a large capacity in an external circuit for speed alignment and band control, can easily maintain a band of a normality confirmation packet of user data transfer path (referred to as a communication path in the followings) without influencing the user band at a state of in-band and a communication control method using the switch.

In order to achieve the above-mentioned object, in an ATM cell/packet switch of the invention, normality confirmation of the switch or communication between processors is performed synchronously with a refresh operation of the memory in an ATM/cell packet switch comprising a memory as an input buffer, which requires a periodical refresh.

The ATM cell/packet switch of the invention comprises at least: a memory for storing user data; a packet generator for generating a normality confirmation packet; a timing generator for generating timing of a refresh cycle of the memory; a selector for selecting a packet to be transferred to a switch unit according to an instruction from the timing generator and for transferring the normality confirmation packet at the time of the refresh in the memory while transferring the user data at other times; and a packet reception unit for extracting packet identifying information from received packet data and for, when the packet data is a normality confirmation packet, performing normality confirmation by comparing a normality confirmation packet directly received from the packet generator to a normality confirmation packet received via the switch unit.

The ATM cell/packet switch of the invention comprises at least: a processor-communication memory for storing communication data between processors; a memory for storing user data; a timing generator for generating timing of a refresh cycle of the memory; a selector for selecting a packet to be transferred to a switch unit according to an instruction from the timing generator and for transferring the normality confirmation packet at the time of the refresh in the memory while transferring the user data at other times; and a packet reception unit for extracting packet identifying information from received packet data and for, when the packet data is communication data between processors, giving a receiving request of the communication data between the processors to a predetermined processor.

A communication control method of the invention is a method using an ATM cell/packet switch comprising a memory as an input buffer, which requires a periodical refresh. The normality confirmation of the switch or communication between processors is performed utilizing a refresh operation of the memory.

The communication control method of the invention using an ATM cell/packet switch comprises at least the steps of: storing user data in a memory; generating a normality confirmation packet; generating timing of the refresh cycle of the memory; selecting a packet to be transferred to a switch unit according to an instruction from the timing generator and transferring the normality confirmation packet at the time of the refresh in the memory while transferring the user data at other times; and extracting packet identifying information from received packet data and, when the packet data is a packet data for normality confirmation, performing normality confirmation by comparing a normality confirmation packet directly received from the packet generator to a normality confirmation packet received via the switch unit.

The communication control method of the invention using an ATM cell/packet switch comprises at least the steps of: storing communication data between processors to a memory for processor-communication data; storing user data in a memory; generating a normality confirmation packet; generating timing of a refresh cycle of the memory; selecting a packet to be transferred to a switch unit according to an instruction from the timing generator and transferring the normality confirmation packet at the time of the refresh in the memory while transferring the user data at other times; and extracting packet identifying information from received packet data and, when the packet data is communication data between processors, giving a receiving request of the communication data between the processors to a predetermined processor.

Also, it is preferable that the memory of the invention be an SDRAM (Synchronous Dynamic Random Access Memory).

As described, in the invention, tests on the interface between the switch unit are performed utilizing the refresh cycle of the SDRAM. Therefore, even in the case of a heavy user traffic, normality confirmation of the interface can be performed having no influence on the user band without detecting the user traffic on the communication path and providing a circuit for sorting out the confliction with the user traffic. Also, communication between processors can be performed through the communication path.

DETAILED DESCRIPTION OF THE PREFERRED EMBODIMENTS

Preferred embodiments of an ATM cell/packet switch according to the invention comprises a circuit and a switch unit. The circuit comprises a circuit interface unit performing interface with an external circuit, an SDRAM and a memory controller for receiving and storing user packet data, a normality confirmation packet generator for generating a normality confirmation packet, a timing generator for generating timing of the refresh cycle of the memory, a selector for transferring the normality confirmation packet at the time of the refresh and transferring user packet data at other times according to an instruction from the timing generator, a packet reception unit for extracting packet identifying information from the received packet data and for, when the packet data is a normality confirmation packet, performing normality confirmation by comparing a normality confirmation packet directly received from the packet generator to a normality confirmation packet received via the cross-point switch of the switch unit. In the ATM cell/packet switch, normality confirmation can be performed by utilizing the refresh cycle of the SDRAM thereby having no influence on the user band.

EXAMPLES

The preferred embodiment of the invention mentioned above will be described in detail by referring to EXAMPLES of the invention with reference to accompanying drawings.

Example 1

Figure 1:
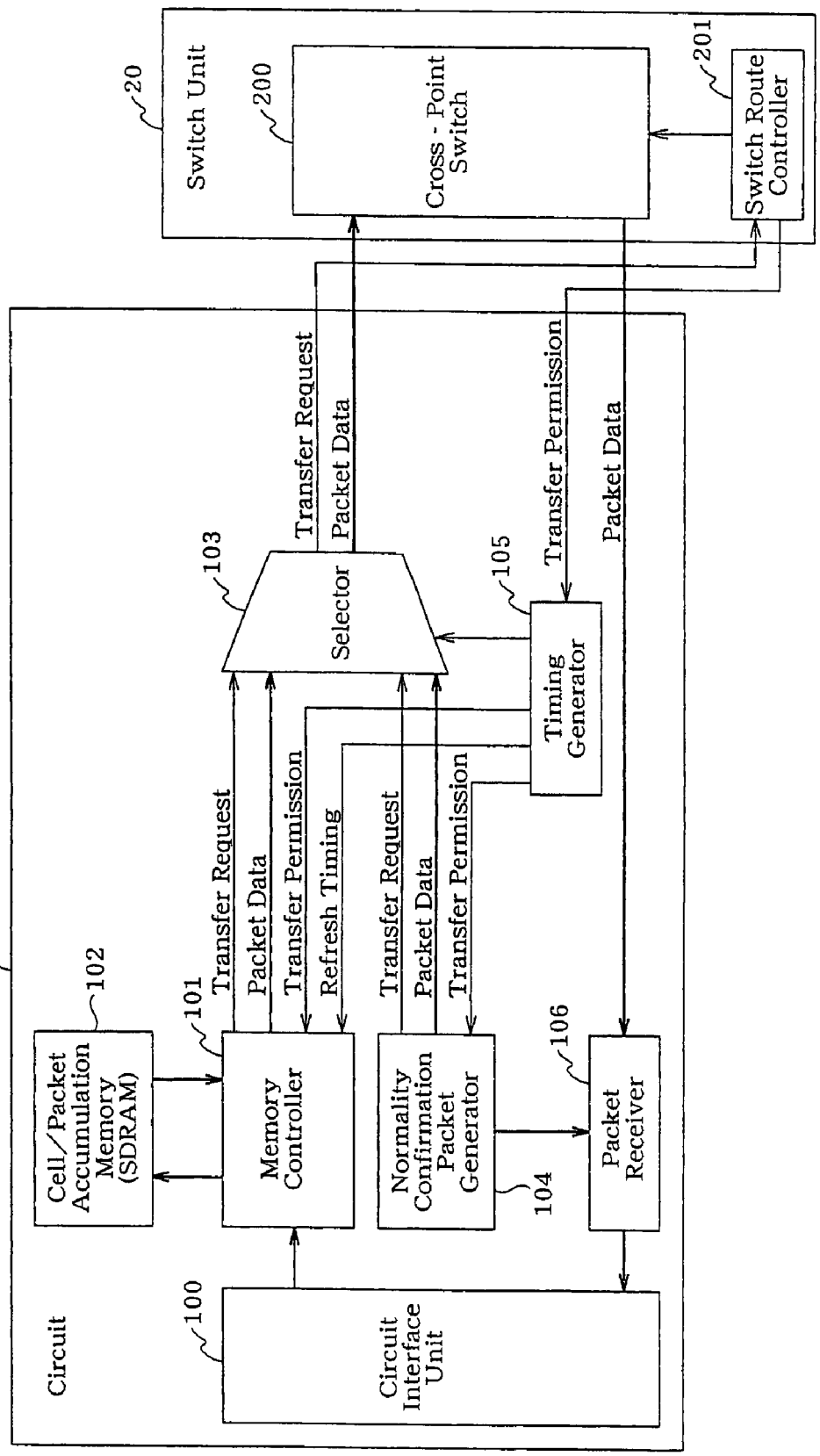
FIG. 1 is a block diagram showing the configuration of an ATM cell/packet switch according EXAMPLE 1 of the present invention.
Figure 2:
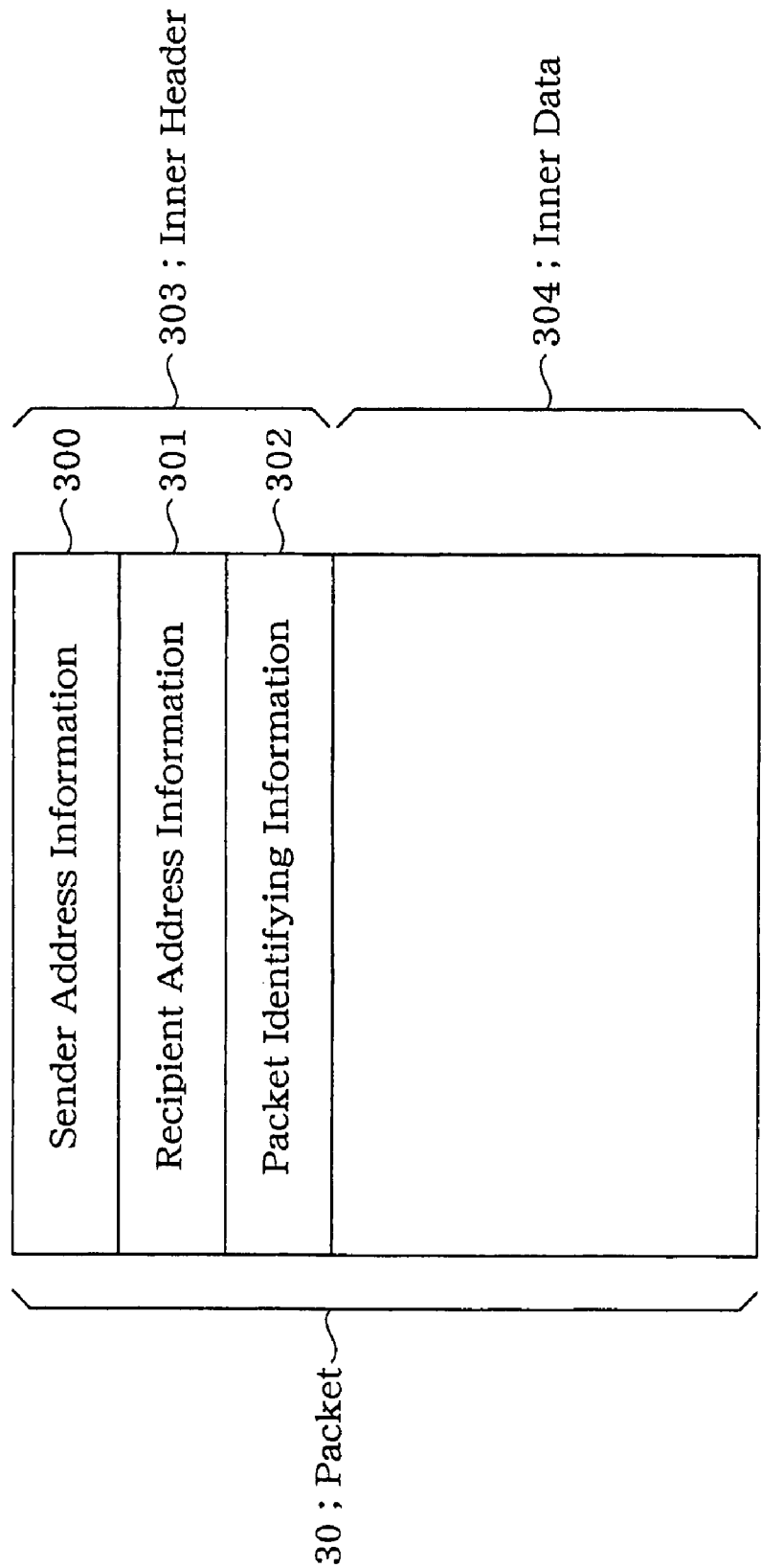
FIG. 2 is an illustration showing a format of a packet data transferred to the ATM cell/packet switch according to EXAMPLE 1 of the present invention.

First, an ATM cell/packet switch and a communication control method using the switch according to EXAMPLE 1 of the invention will be described by referring to FIG. 1 and FIG. 2. FIG. 1 is a block diagram showing the overall configuration of the ATM cell/packet switch according to EXAMPLE 1. FIG. 2 is an illustration showing an example of a format of packet data to be transferred.

Now, the configuration of the ATM cell/packet switch according to EXAMPLE 1 will be described by referring to FIG. 1. A circuit interface unit 100 performs interface with an external circuit. A memory controller 101 performs read/write of cell/packet received from the circuit interface unit 100 from/to a cell/packet accumulation memory 102 and request transfer of data to a switch route controller 201 mounted on a switch unit 20. The cell/packet accumulation memory 102 is formed of a memory in which a periodical refresh operation is performed, e.g., SDRAM, and accumulates the cell/packet transferred from the circuit interface unit 100. A selector 103 requests transfer of data from a circuit 10 to the switch unit 20 and selects the route of packet data by the control of the timing generator 105.

A normality confirmation packet generator 104 generates normality confirmation packet/cell (in the followings, referred to as a health check packet) for confirming the normality inside the device and requests transfer of data to the switch unit 20 while transmitting the health check packet to a packet reception unit 106. A timing generator 105 generates the refresh timing for the cell/packet accumulation memory 102 and controls conversion of a selector 103. The timing generator 105 also transfers a data transfer permission from the switch route controller 201 to the memory controller 101/normality confirmation packet generator 104.

A cross-point switch 200 transfers data according to the route control information from a switch route controller 201. The switch route controller 201 sorts out the conflict and gives a transfer permission for the data transfer request from a circuit 10. A packet reception unit 106 receives a packet 30 in a format as shown in FIG. 2. At this time, the packet reception unit 106 retrieves a packet identifying information 302 from the packet 30, thus to recognize a health check packet and user packet based on the contents of the information. The reception unit 106 transmits the data to the circuit interface unit 100 when the received packet is the user packet, and compares the data to packet data obtained from the normality confirmation packet generator 104 when the packet is the health check packet thereby to confirm the normality of the communication path.

The operation of the ATM cell/packet switch with the above-mentioned configuration will be described. Upon receiving a packet/cell, the circuit interface unit 100 transfers the packet/cell to the memory controller 101. The memory controller 101 stores the packet/cell received from the circuit interface unit 100 in the cell/packet accumulation memory 102 and requests transfer of data to the switch route controller 201. The timing generator 105 controls the routes of the circuit 10 and the switch unit 20 to be either on the memory controller 101 side or the normality confirmation packet generator 104 side. Normally, the timing generator 105 controls the memory controller 101 side to be effective.

The cell/packet accumulation memory 102 is SDRAM and the like so that, as well-known to those skilled in the art, it is necessary to perform the refresh cycle periodically. Therefore, the timing generator 105 generates timing for the refresh cycle of the cell/packet accumulation memory 102 and, at the time of the refresh cycle, gives an instruction to the memory controller 101 to execute the refresh cycle of the cell/packet accumulation memory 102. At the same time, the timing generator 105 controls the selector 103 so as to conversion the route to the switch unit 20 in the normality confirmation packet generator 104 direction.

For example, in the case where the device is operated in a constant cycle, provided that the refresh cycle of the SDRAM is 64 cycles, the route to the switch unit 20 is connected to the controller 101 direction 63 times out of 64 times and is connected to the normality confirmation packet generator 104 direction only once in 64 times.

When the route to the switch unit 20 is established, the normality confirmation packet generator 104 as data transfer permission and the packet data to the switch route controller 201 according to the transfer permission as in the same manner as the memory controller 101. At the same time, the normality confirmation packet generator 104 transmits the health check packet data to the packet reception unit 106. The health check packet is a packet/cell for the self-circuit so that it is to be received in the packet reception unit 106 via the cross-point switch 200. Then, the packet reception unit 106 compares the received health check packet to the packet data received from the normality confirmation packet generator 104 thereby to confirm the normality of the communication path.

As described, in the ATM cell/packet switch and the communication control method using the switch according to EXAMPLE 1, in a configuration using a memory such as an SDRAM as an input buffer in which a periodical refresh is performed, the packet generated by the normality confirmation packet generator 104 is transferred at the time of the refresh operation of the SDRAM and to compare it to the packet returned via the switch unit 20 in the packet reception unit 106. Thereby, the normality of the ATM cell/packet switch can be confirmed periodically without influencing the user traffic.

Example 2

Figure 3:
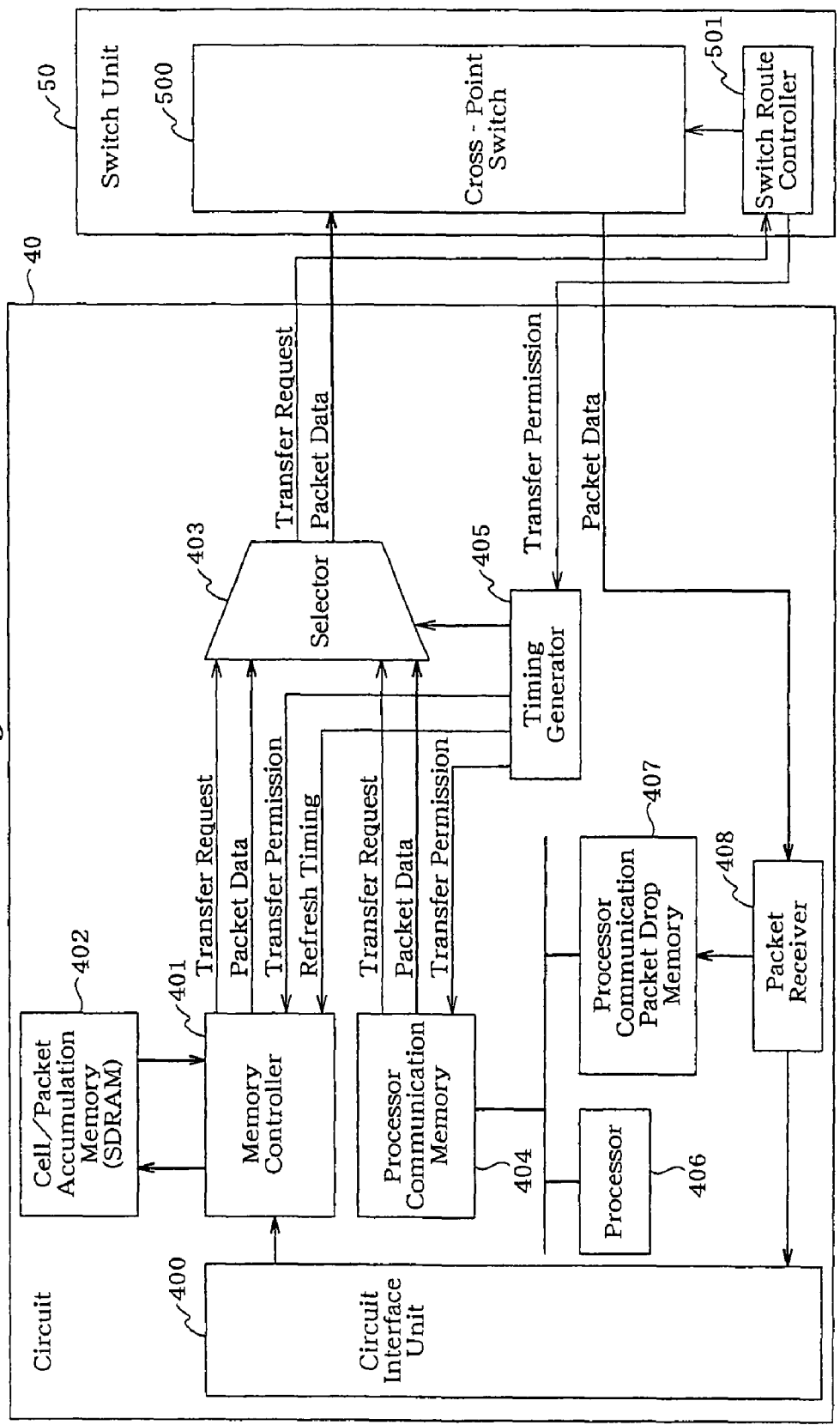
FIG. 3 is a block diagram showing the configuration of an ATM cell/packet switch according to EXAMPLE 2 of the present invention.

Next, an ATM cell/packet switch and a communication control method using the switch according to EXAMPLE 2 of the invention will be described by referring to FIG. 3. FIG. 3 is a block diagram showing the overall configuration of the ATM cell/packet switch according to EXAMPLE 2. EXAMPLE 2 exhibits such characteristic that, as shown in FIG. 3, communication is controlled utilizing the refresh operation of the SDRAM in a system where communication between the processors is performed through a communication path.

The configuration of the ATM cell/packet switch according to EXAMPLE 2 will be described by referring to FIG. 3. A processor 406 writes necessary packet data on a processor-communication memory 404. A timing generator 405 gives a packet data transmission instruction to the processor-communication memory 404 at the timing of the refresh cycle of a cell/packet accumulation memory 402. The processor-communication memory 404 outputs the packet data accumulated therein to a switch unit 50 according to the instruction.

On the other hand, a packet reception unit 408 which receives the packet data from the switch unit 50 recognizes the contents of a packet identifying information 302 stored in the inner header of the received packet data 30. The packet reception unit 408 transfers the packet to a circuit interface unit 400 when the packet is the user packet, and writes the packet data on a processor-communication drop memory 407 and gives a receiving request to a processor 406 when the packet is the processor-communication data. Thereby, it becomes possible to perform communication between processors without influencing the band of the user traffic in in-band.

As described, in the ATM cell/packet switch and the communication control method using the switch according to the embodiment, the processor-communication data stored in the processor-communication memory 404 is transmitted at the time of the refresh operation of the SDRAM and the packet reception unit 408 identifies the user packet data and the processor-communication data based on the packet identifying information of the received packet data 30. Therefore, communication between the processors can be performed periodically without influencing the user traffic.

As described, the ATM cell/packet switch and the communication control method using the switch according to the invention have the following effects.

For example, the first effect of the invention is to be able to confirm the normality of the ATM cell/packet switch without influencing the user band even if the user traffic is heavy since the tests on the interface between the switch unit are performed utilizing the refresh cycle of the SDRAM.

The second effect of the invention is to be able to reduce the number of detection circuits since there is no need to detect the existence of the user traffic on the communication path or to sort out the conflict with the user traffic.

The third effect of the invention is to be able to confirm the normality of the interface in an asynchronous system such as the ATM cell switch or a packet switch in the same precision as the synchronous router system since the periodic insert of packets is surely performed.

The invention may be embodied in other specific forms without departing from the spirit or essential characteristic thereof. The present embodiments are therefore to be considered in all respects as illustrative and not restrictive, the scope of the invention being indicated by the appended Claims rather than by the foregoing description and all changes which come within the meaning and range of equivalency of the Claims are therefore intended to be embraced therein.

The entire disclosure of Japanese Patent Application No. 2001-211063 (Filed on Jul. 11, 2001) including specification, claims, drawings and summary are incorporated herein by reference in its entirety.

What is claimed is:

1. An Asynchronous Transfer Mode (ATM) cell/packet switch, comprising:
   a user memory configured as an input buffer, the user memory configured to require a periodic refresh;
   a memory controller configured to execute the periodic refresh of the user memory;
   a packet generator configured to generate a normality confirmation packet;
   a selector configured to transfer the normality confirmation packet generated by the packet generator;
   a processor-communication memory for storing communication data between processors; and
   a timing generator configured to cause the memory controller to execute a first periodic refresh and cause the selector to transfer the normality confirmation packet during the first periodic refresh, and further configured to cause the memory controller to execute a second periodic refresh and cause the processor-communication memory to perform communication between processors during the second periodic refresh,
   wherein the selector maintains, in a user band, a band for transferring the normality confirmation packet during a period of the periodic refresh of the user memory for comparison with a returned packet to confirm the normality of the switch.

2. The ATM cell/packet switch as claimed in claim 1, wherein the memory is an SDRAM.

3. The ATM cell/packet switch as claimed in claim 1, wherein the selector is configured to perform the normality confirmation only with the simultaneous first periodic refresh of the memory, and
   wherein the processor-communication memory is configured to perform a communication between processors only with the simultaneous second periodic refresh of the memory.

4. The ATM cell/packet switch as claimed in claim 1, wherein the user memory is configured to store user data as a result of user traffic in the user band, and
   wherein the band for transferring the packet during the period of the periodic refresh of the user memory does not impact the user traffic of the user band.

5. A communication control method using an Asynchronous Transfer Mode (ATM) cell/packet switch, comprising the steps of:
   causing i) a first refresh operation to be performed on an input buffer memory, and ii) execution of a normality confirmation of the ATM cell/packet switch simultaneously with the first refresh operation;
   causing iii) a second refresh operation to be performed on the input buffer memory, and iv) execution of a communication between processors simultaneously with the second refresh operation,
   wherein the normality confirmation includes transferring a normality confirmation packet generated by a normality confirmation packet generator to confirm the normality of the ATM cell/packet switch, and wherein the normality confirmation, performed simultaneously with the first refresh operation, maintains a band within a user band for transferring the normality confirmation packet during the first refresh operation of the input buffer memory.

6. The communication control method as claimed in claim 5, wherein the memory is an SDRAM.

7. The communication control method as claimed in claim 5, wherein the normality confirmation is performed only simultaneously with the first refresh operation.

8. The communication control method as claimed in claim 5,
wherein the input buffer memory is configured to store user data as a result of user traffic in the user band, and
wherein the band for transferring the normality packet during the first refresh operation of the input buffer memory does not impact the user traffic of the user band.

9. An Asynchronous Transfer Mode (ATM) cell/packet switch, comprising:
a user memory configured as an input buffer, the user memory configured to require a periodic refresh;
a memory controller configured to execute the periodic refresh of the user memory;
a packet generator configured to generate a normality confirmation packet;
a selector configured to perform a normality confirmation;
a processor-communication memory for storing communication data between processors; and
a timing generator configured to cause the memory controller to execute a first periodic refresh and cause the selector to transfer the normality confirmation packet during the first periodic refresh, and further configured to cause the memory controller to execute a second periodic refresh and cause the processor-communication memory to perform communication between processors during the second periodic refresh,
wherein the selector maintains, in a user band, a band for the normality confirmation during a period of the first periodic refresh of the user memory,
and wherein, during the communication between processors, processor-communication data stored in the processor-communication memory is transmitted at a time of the second periodic refresh so as to maintain, in the user band, a band for communicating processor-communication data during a period of the second periodic refresh of the user memory, and the processor-communication data is identified based on packet-identifying information of a received packet data.

10. The ATM cell/packet switch as claimed in claim 9,
wherein the selector is configured to perform the normality confirmation only simultaneously with the first periodic refresh of the memory, and
wherein processor-communication data stored in the processor-communication memory is transmitted only at the time of the second periodic refresh of the user memory.

11. The ATM cell/packet switch as claimed in claim 9,
wherein the user memory is configured to store user data as a result of user traffic in the user band, and
neither of the band for the normality confirmation nor the band for communicating processor-communication data impacts the user traffic of the user band.

12. A communication control method using an Asynchronous Transfer Mode (ATM) cell/packet switch, comprising the steps of:
causing a first refresh operation to be performed on an input buffer memory;
causing, at a same time as the first refresh operation on the memory, a normality confirmation of the ATM cell/packet switch;
causing a second refresh operation on the input buffer memory; and
causing, at a same time as the second refresh operation, communication between processors,
wherein the communication between processors includes transmitting, at the same time of the second refresh operation, processor-communication data stored in a processor-communication memory so as to maintain, in a user band, a band for communicating processor-communication data during the second refresh operation of the user memory, and
wherein the communication between processors further includes identifying the processor-communication data based on a packet-identifying information of a received packet data.

13. The communication control method as claimed in claim 12, wherein the communication between processors is performed only at the same time as the second refresh operation.

14. The communication control method as claimed in claim 12,
wherein the input buffer memory is configured to store user data as a result of user traffic in the user band, and
wherein neither of the normality confirmation nor the communication between processors impacts the user traffic of the user band.

* * * * *